(12) United States Patent
Bland

(10) Patent No.: US 6,598,953 B2
(45) Date of Patent: Jul. 29, 2003

(54) METHOD FOR JUDGING IMAGE QUALITY USING HUMAN-READABLE DEFECT-SENSITIVE PATTERNS

(75) Inventor: William E. Bland, Cardiff-by-the-Sea, CA (US)

(73) Assignee: Phogenix Imaging, LLC, San Diego, CA (US)

( * ) Notice: Subject to any disclaimer, the term of this patent is extended or adjusted under 35 U.S.C. 154(b) by 0 days.

(21) Appl. No.: 10/032,920

(22) Filed: Dec. 28, 2001

(65) Prior Publication Data

US 2003/0122887 A1 Jul. 3, 2003

(51) Int. Cl.[7] .............................................. B41J 29/393
(52) U.S. Cl. ........................................................ 347/19
(58) Field of Search .............................. 347/19, 14, 23, 347/10, 11, 12, 41, 40, 42, 43, 16, 13, 20, 15, 7, 85–87; 358/504

(56) References Cited

U.S. PATENT DOCUMENTS 6,056,386 A * 5/2000 Nohata et al. ................. 347/19
6,454,390 B1 * 9/2002 Takahashi et al. ............. 347/71

* cited by examiner

*Primary Examiner*—Raquel Yvette Gordon
*Assistant Examiner*—Charles W. Stewart, Jr.
(74) *Attorney, Agent, or Firm*—Stephen B. Salai, Esq.; Brian B. Shaw, Esq.; Harter, Secrest & Emery LLP

(57) ABSTRACT

A method for monitoring the condition of an inkjet printhead. A test image is printed by the printhead and a second reference printhead. The density of ink dots in the test image is selected so that each dot just contacts adjacent dots while avoiding significant overlap. A defective nozzle can produce misplaced or undersized dots, creating abnormal spacing between adjacent dots. At the selected ink dot density, the abnormal spacing is most perceptible to the eye.

16 Claims, 5 Drawing Sheets

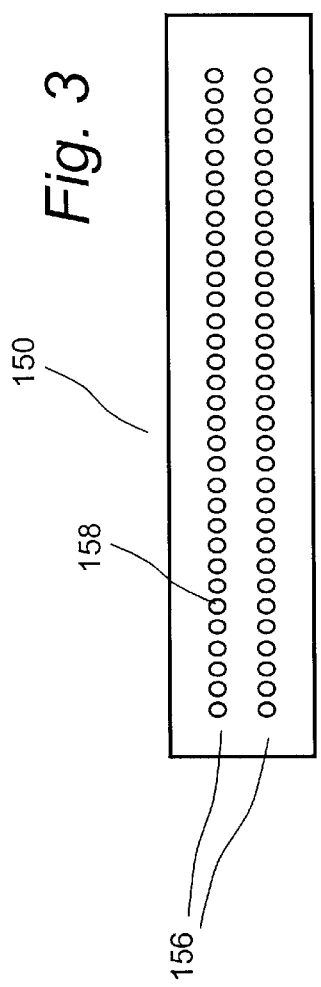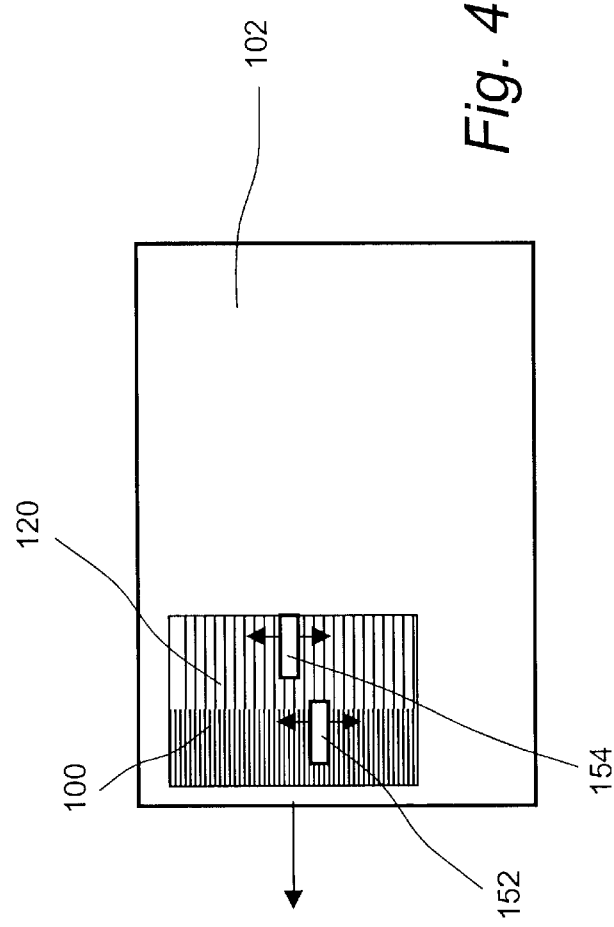

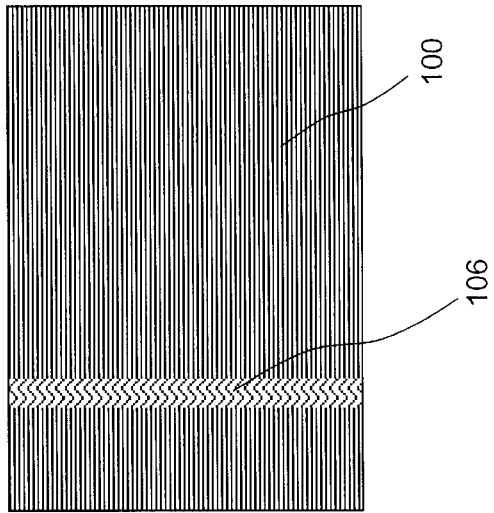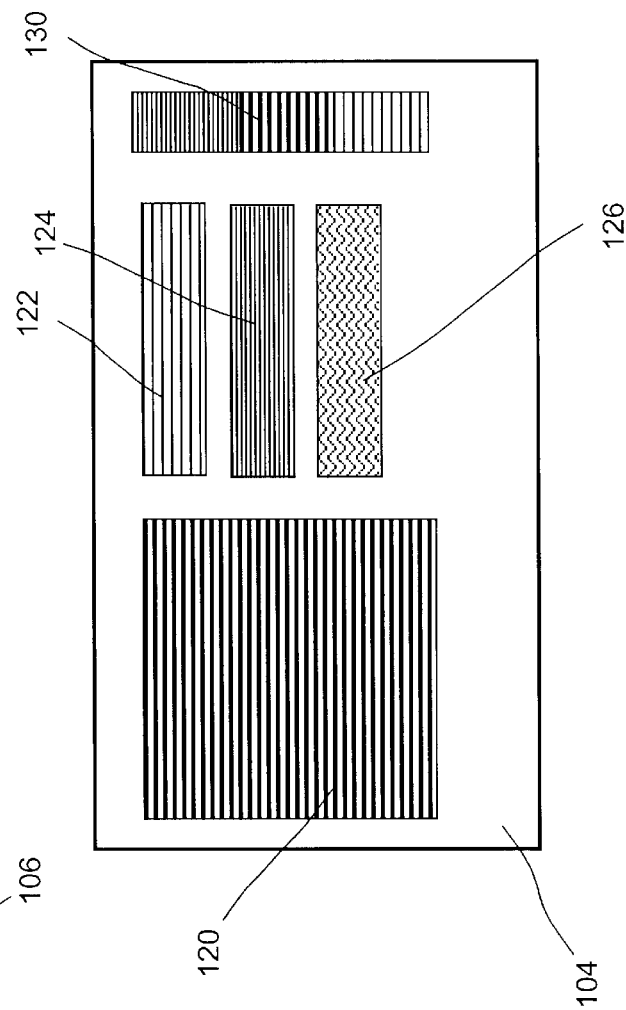

METHOD FOR JUDGING IMAGE QUALITY USING HUMAN-READABLE DEFECT-SENSITIVE PATTERNS

FIELD OF THE INVENTION

The invention pertains to the image quality produced by a printhead, and in particular to a diagnostic method for anticipating the onset of unacceptable image quality.

BACKGROUND OF THE INVENTION

Inkjet printers are efficient, quiet and can produce high quality print images in a relatively inexpensive manner. Such quality is achieved by sweeping a printhead with a large number of inkjet nozzles over a print medium and ejecting ink droplets onto the medium in a matrix array of minute ink dot patterns. As is well known in the art, a printed image is made up of discrete picture elements or pixels. The closer together the pixels, the more readily can it be perceived by a human eye as a continuous image. The quality of the print image is then determined by assuring that each ink droplet has a precise volume of ink that is applied to a specific location on the print medium without smearing.

Color printing requires a plurality of printheads, each delivering ink of a single color, to be referred to as a primary color. To produce an image on a medium such as paper, the primary colors are delivered to a pixel location as determined by the color requirements at that area. There are methods well known in the art to provide that that the primary colors are present on the medium as discrete dots that do not smear or mix, but nevertheless register with a human eye as mixed colors contributing to high quality full color images. Unless a desired color happens to coincide with a primary color, an image color therefore relies for its formation on more than one printhead. In a typical image, there are typically 600 pixels per inch or 24 pixels per mm.

While inkjet printers produce high quality photo-like images, it is well known to those skilled in the art that dot size and placement accuracy degrade with time due to mechanical and electrical fatigue factors associated with the printhead nozzles of such printers. Such nozzle fatigue factors can include a buildup of firing residue on resistors, and droplet directionality can change because orifice plates may be scratched through continued wiping by service station cleaning apparatus. They are generally manifested in pattern-like printing errors that become quite noticeable.

Some prior solutions err on the side of replacing the printhead sooner than necessary, which is wasteful. These include dictating a specific lifetime for a printhead based on its time in service, or on the volume of ink ejected. Attempts have been made to predict image quality based on nozzle health or algorithms based on nozzle performance. One such method relies on amplifying defects, that is, detecting them sooner than they would occur in normal use. This can be done by using fewer passes than normal of the printhead over the medium. However, a printhead can be useful for some time after failing a diagnostic test of this kind.

Other solutions are backward looking, noting defects only after they have occurred in prints. However, once defects have become obvious to customers, the loss of customer goodwill may result.

There is therefore a need for a just-in-time solution which can detect the onset of defects as late as possible in the lifetime of a printhead while precluding the possibility of defective images when the printhead is in regular use.

SUMMARY OF THE INVENTION

The invention is a test image printed predominantly by an ink jet printhead under evaluation. However, another printhead, assumed to be functioning normally, also contributes to the test image. The image has a plurality of tiles or regions of a selected uniform solid color with a selected brightness and a selected hue. The tile is selected to be most sensitive to the types of defect encountered with regular images. It has been found by experiment that certain configurations of test images are most sensitive to defects. In particular, an ink dot density selected so that adjacent ink dots just overlap provides an optimum sensitivity. Defects are observed in such test images serve to indicate the imminence of similar defects in regular images. Test images are run according to a schedule determined by an algorithm. The algorithm is based on various inputs, including the age of the printhead, the volume of ink printed by the printhead, the time elapsed since an immediately preceding diagnostic print, and a physical evaluation of the printhead. Previously, such an algorithm would be used as a direct indicator of when a printhead should be replaced. However, producing a defect-free test image allows the useful life of the printhead to be extended.

BRIEF DESCRIPTION OF THE DRAWINGS

FIG. 3 is a schematic representation of nozzles on a printhead.

FIG. 4 schematically shows a test image being printed onto the medium using a suspect printhead and a reference printhead.

FIGS. 5(*c*) and 5(*d*) schematically show arrays of ink dots at a dot density greater than the preferred dot density in the absence and presence of a defective ink dot.

FIG. 6 shows a portion of the test image with an example of an imperfection resulting from ink dot defects.

FIG. 7 shows a test print with a test image in a second embodiment.

DETAILED DESCRIPTION OF THE INVENTION

Figure 1:
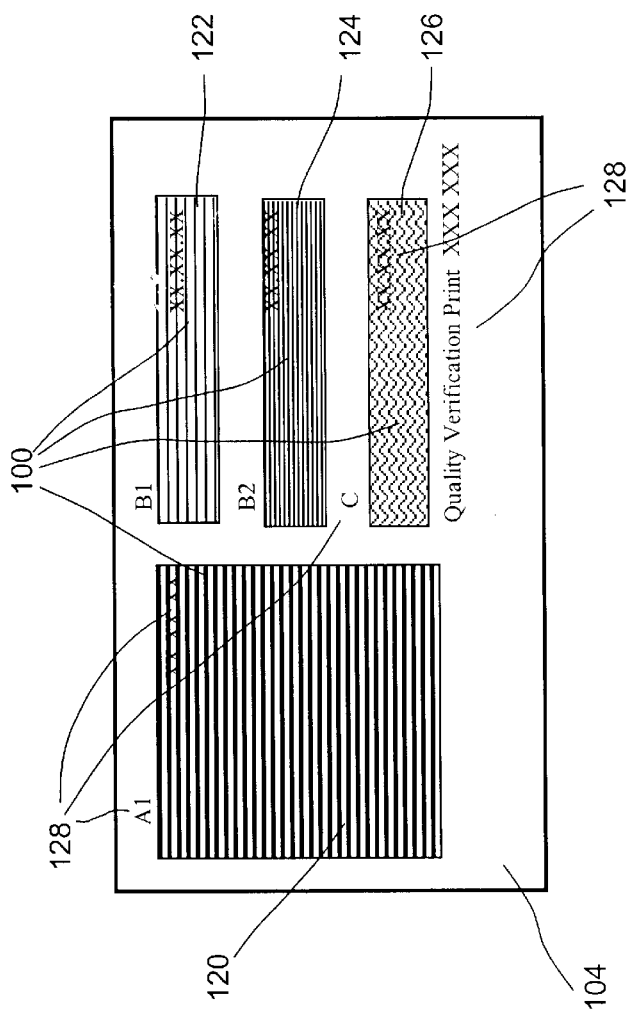
FIG. 1 shows a test print with a test image in a preferred embodiment.

Referring to the drawings, FIG. 1 shows a plurality of test images, 100 for evaluating the performance of a printhead 150 in an inkjet printer 140. The test images 100 are printed on a sheet of printing paper 1-2 (see FIG. 2) or other medium similar to that conventionally used with the printer 140 to produce a test print 104.

Figure 2:
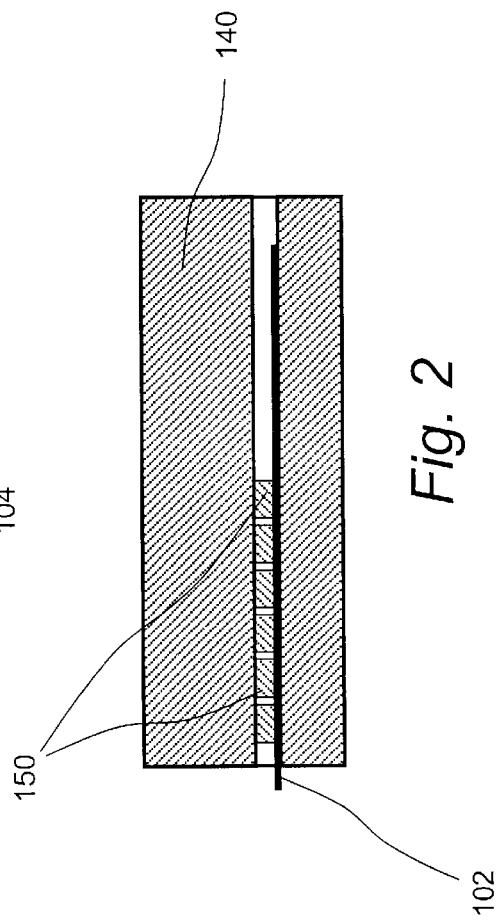
FIG. 2 is a schematic cross-section of a printer while printing onto a medium.

FIG. 2 is a schematic showing the printer in the process of printing onto the paper 102. Typically, the printer 140 has six printheads 150, each delivering ink of a different color. The colors are typically dark cyan, light cyan, dark magenta, light magenta, yellow and black. These will be referred to as primary colors.

As is known in the art of inkjet printing, the test image 100, like conventional images, is made up of individual picture elements or pixels. Colors seen by a viewer of the test image 100 are built up from the attributes of the individual pixels. The color attributes are lightness, hue and chroma. Lightness describes the intensity or otherwise of a given color. Hue describes some degree of departure from that color. A given color perceived by a human eye is determined by the total and relative densities of the primary colors. A given location is uniquely described by its combination of attributes. Chroma can be thought of as describing the brightness of the color, not in the sense of intensity but in the sense of defining some degree of grayness. The use of black as a primary color is to provide for variations in chroma.

A typical inkjet printhead 150 has two rows 156 of nozzles 158, each row having 156 nozzles 158. The rows 156 are spaced 0.0017" (42 $\mu$m) apart, and adjacent nozzles 158 in the same row are 0.0033" (85 $\mu$m) apart. The nozzles 158 are typically about 20 $\mu$m in diameter. The arrangement of the nozzles is shown schematically in FIG. 3.

For a white area of a conventional image on white paper, no ink is required. When the desired color of a given pixel happens to coincide with a primary color, that pixel will only require ink from one printhead 150. More usually, two or more printheads 150 will be needed to produce the desired color. In a simple example wherein only two printheads 150 are required, hue is determined by the ratio of the two primary colors. If one of the primary colors is black, the ratio determines the chroma. Thus, for the purposes of this invention, a change of hue is functionally equivalent to a change of chroma. Therefore, any reference to a hue will be understood to include chroma, unless specifically stated otherwise.

Each nozzle 158 when fired typically delivers an ink droplet with a volume of about 8 picolitres (equivalent to a mass of about 8 nanograms). The droplet typically spreads out to about 63 nm in diameter before drying to form an ink dot 110. The color at a given pixel are determined by the volumes and relative proportions of ink of each primary color. The ink volume delivered by each firing is nominally constant. A multiplicity of dots 110 of the same primary color may be required to contribute to a given color in any pixel, which is usually achieved by firing again in that same pixel using a different nozzle on a later pass. In an exemplary system, each printhead 150 passes over every pixel with 8 different nozzles giving plenty of opportunity to place more ink at each spot. This avoids exaggerating any error associated with a single nozzle 158. With six printheads 150, each pixel could theoretically receive 48 ink droplets, although obviously this exceeds by far any number of droplets ever delivered.

A suspect printhead 152 is evaluated by using it to print the test image 100. However, experience has shown that the test image 100 most sensitively reveals defects in the suspect printhead 152 when one of the other printheads, assumed to be in good condition, also contributes to the test image 100 as a reference printhead 154. Thus, the suspect printhead 152 is the major but not the sole contributor to the test image 100. The printing of the test image is shown schematically in FIG. 4.

In the preferred embodiment, the test image 100 has four color tiles. When defect-free, each of the tiles is uniform but has a different color. In the context of the tiles, differences in color will be understood to include even slight differences. For example, different intensities or hues of yellow are understood as different colors.

Figure 5B:
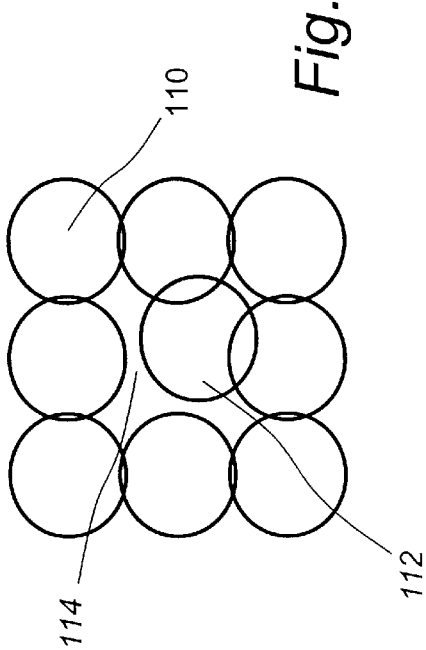
FIGS. 5(*a*) and 5(*b*), schematically show arrays of ink dots at a preferred dot density in the absence and presence of a defective dot.
Figure 5A:
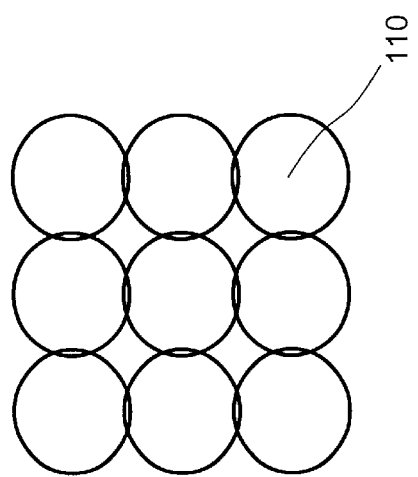
Figure 5D:
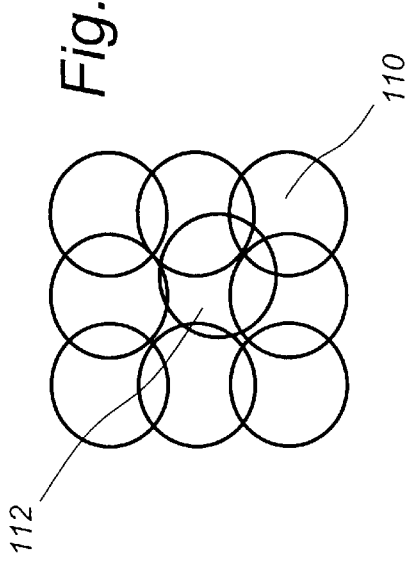
Figure 5C:
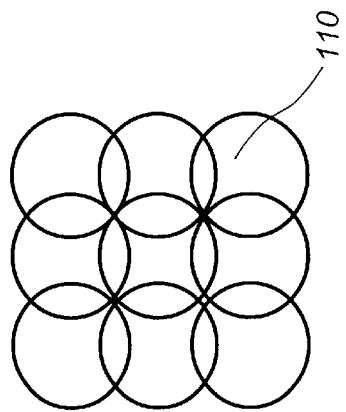

In all the tiles, ink dots 110 are printed at the highest practical density consistent with their overlapping but to a minimal degree. The advantage of such a density is seen in FIG. 5. The preferred dot density is illustrated in FIG. 5(a), which shows an array of defect-free dots 110 which are part of a larger matrix. FIG. 5(b) shows an array having the preferred dot density but including a defective dot 112 which is misplaced. The misplacement produces a space 114 between it and at least one of the adjacent non-defective dot 110. FIG. 5(c) shows an array of defect-free dots 110 having a greater dot density than FIG. 5(a). FIG. 5(d) shows an array at this greater dot density but including a misplaced dot 112. In this case the defective dot 112 still contacts all of its defect-free neighboring dots 110.

Thus, at the preferred dot density, the presence of a defective dot 112 is much more likely to produce a perceptible difference in the area of "white" space between dots than at the greater density. Similarly, if the dot density were such that adjacent dots were not in contact, a defective dot 112 would produce little perceptible difference in the area of white space between dots. Such considerations would also apply if the defective dot 112 were undersized, even if it were not misplaced.

The reader may be helped by an analogy with a venetian blind. A slightly deformed slat would be most apparent with the blind adjusted to generally just exclude the transmission of direct light to a viewer. It would be much less noticeable if the blind were more fully shut or more fully open.

Thus, the preferred density is the most sensitive to dot misplacement and dot size irregularities. This translates to an optimum detectability of image quality imperfections. A banding defect 106 in the test image 100 is illustrated in FIG. 6. Although any defects present in the test image 100 will obviously be present in a conventional image, they may not yet be easily perceptible. The test image 100 is configured to render defects more perceptible than in the test image 100. Thus the imminent onset of perceptible imperfections in the conventional image is anticipated by their presence in the test image 100.

That the test image 100 can reveal defects which are not yet obvious in a conventional image becomes understandable when one considers that the conventional image may typically may only have few areas with the optimum dot density, and fewer areas (or even none) where the optimum density coincides closely enough with the color delivered by the suspect printhead 152.

The contribution of the reference printhead 154 to the test image 100 becomes apparent when one considers that the dots it generates can be assumed to be defect free. If only the suspect printhead 152 were used, some defect might go unnoticed if it were shared by all its nozzles 158 or graded along the nozzles.

In the test image 100, a first or reference tile 120 has a selected color dominated by the primary color of the suspect printhead. A second tile 122 differs from the reference tile only in that the second tile is lighter. A third tile 124 differs from the reference tile only in that the third tile is darker. A fourth tile 126 differs from the reference tile only in that it has a different hue.

It is clear from the foregoing paragraph that the reference printhead 154 must contribute to at least one of the tiles. The following possibilities can be considered.

EXAMPLE 1

The reference tile 120, second tile 122 and third tile 124 are all a primary color printed only by the suspect printhead 152. Because it differs in hue from the reference tile 120, the fourth tile 126 must have a contribution also from the reference printhead 154, since a change in hue requires a second primary color.

EXAMPLE 2

The reference tile 120, second tile 122 and third tile 124 all have contributions in an identical ratio from the suspect printhead 152 and the reference printhead 154. The different hue of the fourth tile 126 is formed by excluding the primary color of the reference printhead 154, and therefore has a contribution from only the suspect printhead 152.

EXAMPLE 3

The reference tile 120, second tile 122 and third tile 124 all have contributions in an identical ratio from the suspect printhead 152 and the reference printhead 154. The fourth tile 126 has contributions from both the suspect printhead 152 and the reference printhead 154 in a different ratio.

Increasingly complex possibilities could obviously be considered if even more printheads were used along with the suspect printhead 152. In practice, Example 3 provides the most useful scenario, since it provides the maximum opportunity for comparing the suspect printhead 152 with the reference printhead 154 which is assumed to be in good condition. Clearly, adding even more "normal" printheads would contribute little or no more information of value to the test image 100. The test image 100 is configured so that the ink dots from the reference printhead are evenly interspersed among those from the suspect printhead.

The test print 104 has various indicia 128 to identify the tiles and the print itself, and to provide a unique record of the color of each tile. This record might for example have information on dot density and relative primary color dot densities.

In another embodiment shown in FIG. 7, the test image also includes a graded tile 130 which differs from the reference tile 120 solely in that its lightness (intensity) is graded over its length.

The invention is practiced as follows, in order to provide a "just-in-time" diagnosis of imminent printing defects. Records are kept for each printhead, and an algorithm developed on the basis of those records for when a given printhead might be expected to fail. Factors such as the age of the printhead, the volume of ink printed by the printhead, the time elapsed since an immediately preceding diagnostic print from the printhead, and a physical evaluation of the printhead could be used in the algorithm.

Figure 8:
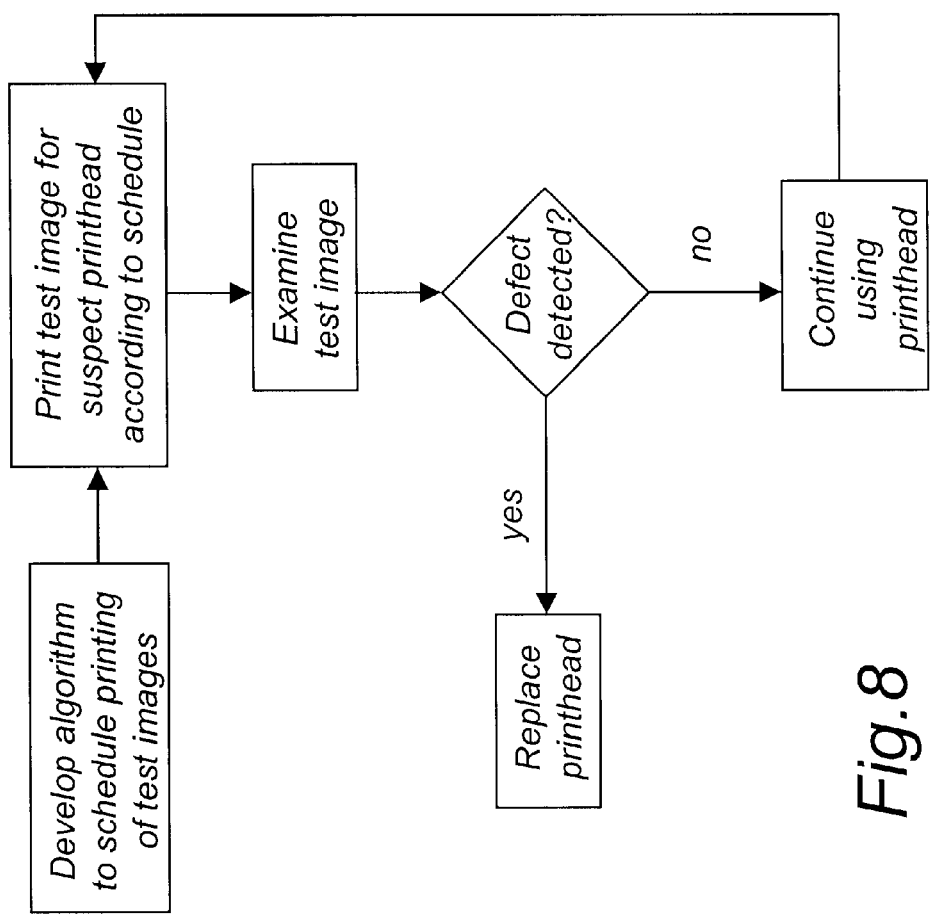
FIG. 8 is a flow chart showing the use of the test image.

In prior art such an algorithm, if used at all, would serve to indicate that the printhead should be replaced. This runs the risk of disposing of the printhead while it still has a useful lifetime, and is obviously wasteful. In the present invention, the algorithm is used simply to determine a schedule for running a test image, its use being illustrated by the flow chart of FIG. 8. If, for example, it is determined that the dark magenta printhead should be tested, this would be designated as the suspect printhead 152. Of the four tiles of the test image, the reference tile 120 would be dark magenta of a selected lightness. The second tile 122 would be a somewhat less intense version of the dark magenta, and the third tile 124 would be a somewhat more intense version of the dark magenta. Each of these dark magenta tiles might be modified by designating yellow as the reference printhead 154, and printing the reference tile 120, second tile 122 and third tile 124 in the same ratio of dark magenta to yellow. The fourth tile 126 would be identical to the reference tile 120 except that its hue would be altered by slightly raising or lowering the dark magenta to yellow ratio.

As has been indicated earlier, the density of ink dots 110 in the test image is selected to be so that they just contact each other and avoid substantial overlap. Under these conditions, the tiles are sufficiently sensitive to reveal defects which might otherwise go unnoticed until their appearance in photographic prints prepared for a customer. If no defects appear in the test print 104, the suspect printhead may be left in place, thus gaining additional lifetime. On the other hand, the appearance of defects in the test print 104 indicates that they would soon have appeared in regular prints. A replacement printhead is then installed. The use of the test print optimizes the useful lifetime of the printhead while avoiding a chance of customer dissatisfaction.

Despite a preference for a test image wherein all pairs of adjacent non-defective ink dots just overlap, other scenarios are possible. An ink dot density may be selected having a standard or defined spacing between adjacent dots. One may select the standard spacing to be zero or non-zero. The standard spacing might be zero in one direction and non-zero in another direction relative to the direction of the test image. Ink dots originating from defective nozzles would deviate from the standard spacing and a defective test image would result.

While the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. A method of evaluating the performance of an inkjet printhead, comprising:
    (a) establishing an algorithm based on at least one of a group of factors consisting of the age of the suspect printhead, the volume of ink printed by the suspect printhead, the time elapsed since an immediately preceding diagnostic print from the suspect printhead, and a physical evaluation of the printhead, to determine when the test image should be printed;
    (b) creating a test image comprising a matrix of adjacent dots;
    (c) selecting an ink dot density which causes each dot of the matrix to overlap at least one adjacent dot;
    (d) printing the test image with the printhead;
    (e) detecting the presence of spaces between adjacent dots; and
    (f) comparing the spaces with a standard.

2. A method of evaluating the performance of an inkjet printhead, comprising:
    (a) establishing an algorithm based on at least one of a group of factors consisting of the age of the suspect printhead, the volume of ink printed by the suspect printhead, the time elapsed since an immediately preceding diagnostic print from the suspect printhead, and a physical evaluation of the printhead, to determine when the test image should be printed;
    (b) creating a test image comprising a matrix of dots;
    (c) selecting an ink dot density with standard spacings between adjacent dots such that the standard spacings can include zero and non-zero spacings; and
    (d) comparing actual spacings between adjacent dots with the standard spacings.

3. A method of evaluating the performance of a suspect inkjet printhead, comprising:
    (a) establishing an algorithm based on at least one of a group of factors consisting of the age of the suspect printhead, the volume of ink printed by the suspect printhead, the time elapsed since an immediately preceding diagnostic print from the suspect printhead, and a physical evaluation of the printhead, to determine when the test image should be printed;

(b) creating a test image comprising a matrix of dots;

(c) selecting an ink dot density so that adjacent dots in the matrix are spaced apart only when one of the adjacent dots is defective;

(d) printing the test image with the printhead; and (e) detecting the presence of spaces between dots.

4. The method of claim 3, including providing ink dots from a reference printhead in the matrix.

5. The method of claim 4, including providing in the test image a plurality of regions including a reference region.

6. The method of claim 5, including providing that each region has a different color.

7. The method of claim 5 including providing that one region is lighter than the reference region.

8. The method of claim 5 including providing that one region is darker than the reference region.

9. The method of claim 5 including providing that one region has a different hue from the reference region.

10. The method of claim 5 including providing that the regions comprise:

(a) a first region with a first color having a selected intensity and a selected hue;

(b) a second region with a color selected to be less intense than the first color;

(c) a third region with a color selected to be more intense than the first color; and (d) a fourth region with a color selected to have a different hue from the first color.

11. The method of claim 10, including providing that the regions further comprise a graded region.

12. The method of claim 5, including providing that the reference printhead contributes to at least one region.

13. The method of claim 5, including providing that the reference printhead contributes to each region.

14. A method for evaluating the condition of a suspect inkjet printhead, comprising:

(a) establishing an algorithm based on at least one of a group of factors consisting of the age of the suspect printhead, the volume of ink printed by the suspect printhead, the time elapsed since an immediately preceding diagnostic print from the suspect printhead, and a physical evaluation of the printhead, to determine when the test image should be printed;

(b) using the suspect printhead and a reference printhead to produce a test print having a test image with at least one region, each region having a uniform matrix of overlapping ink dots;

(c) examining the test image for the presence of unintended spaces between ink dots; and (d) replacing the suspect printhead based on the results of the examining step.

15. The method of claim 14, further comprising providing indicia on the test print.

16. The method of claim 14, further comprising providing indicia on the test print defining a color of the test image.

* * * * *